United States Patent [19]

Miyashita et al.

[11] Patent Number: 5,209,213
[45] Date of Patent: May 11, 1993

[54] AIR-FUEL RATIO CONTROL METHOD FOR INTERNAL COMBUSTION ENGINES

[75] Inventors: Yukio Miyashita; Kunio Noguchi; Hironao Fukuchi, all of Wako, Japan

[73] Assignee: Honda Giken Kogyo Kabushiki Kaisha, Tokyo, Japan

[21] Appl. No.: 757,424

[22] Filed: Sep. 10, 1991

[30] Foreign Application Priority Data

Sep. 14, 1990 [JP] Japan ................................. 2-245697

[51] Int. Cl.⁵ ............................................. F02D 41/14
[52] U.S. Cl. ....................................... 123/687; 74/860
[58] Field of Search ............... 123/478, 480, 672, 687; 74/859, 860; 364/431.05

[56] References Cited

U.S. PATENT DOCUMENTS

| | | | |
|---|---|---|---|
| 4,596,164 | 6/1986 | Hasegawa | 74/860 |
| 4,732,130 | 3/1988 | Suzuki | 123/480 |
| 4,823,642 | 4/1989 | Iwaki et al. | 74/860 |
| 4,877,006 | 10/1989 | Noguchi et al. | 123/687 X |
| 4,924,832 | 5/1990 | Abe | 74/860 X |
| 5,027,770 | 7/1991 | Yano et al. | 74/860 X |

FOREIGN PATENT DOCUMENTS

| | | | |
|---|---|---|---|
| 60-90948 | 5/1985 | Japan . | |
| 63-12846 | 1/1988 | Japan . | |
| 0102335 | 4/1990 | Japan | 123/687 |

Primary Examiner—Willis R. Wolfe
Attorney, Agent, or Firm—Armstrong, Westerman, Hattori, McLeland & Naughton

[57] ABSTRACT

A method of feedback-controlling the air-fuel ratio of a mixture supplied to an internal combustion engine to a desired air-fuel ratio which is set to a value leaner than a stoichiometric air-fuel ratio, by the use of output from an exhaust gas ingredient concentration sensor, depending upon operating conditions of the engine, the desired air-fuel ratio being set to a leaner value as the transmission of the engine is set to a smaller reduction ratio. A reduction ratio to which the transmission has been set is detected. The travelling speed of a vehicle on which the engine is installed is detected. The desired air-fuel ratio is set to a richer value as the travelling speed of the vehicle is lower, insofar as the transmission is set to the same reduction ratio.

3 Claims, 5 Drawing Sheets

*FIG.4*

|       | PB1        | PB2        | ... | PB10        |
|-------|------------|------------|-----|-------------|
| NEM1  | KBSM(1,1)  | KBSM(1,2)  |     | KBSM(1,10)  |
| NEM2  | KBSM(2,1)  | KBSM(2,2)  |     | KBSM(2,10)  |
| ...   |            |            |     |             |
| NEM20 | KBSM(20,1) | KBSM(20,2) |     | KBSM(20,10) |

AIR-FUEL RATIO CONTROL METHOD FOR INTERNAL COMBUSTION ENGINES

BACKGROUND OF THE INVENTION

The present invention relates to a method of feedback-controlling the air-fuel ratio of an internal combustion engine, and more particularly, it relates to a method of this kind wherein the air-fuel mixture supplied to the engine is feedback-controlled to a desired air-fuel ratio in response to the output of an exhaust gas ingredient concentration sensor having output characteristics in approximate proportion to the exhaust gas ingredient concentration.

Conventionally, it is known to control the air-fuel ratio of a mixture supplied to an internal combustion engine to a value leaner than a stoichiometric ratio when the engine is in a predetermined operating condition. Further, an apparatus for controlling the air-fuel ratio for an internal combustion engine has been proposed by U.S. Pat. No. 4,732,130, in which the air-fuel ratio is controlled so as to become increasingly leaner than the stoichiometric air-fuel ratio as the speed reduction ratio decreases, in order to minimize the rate of fuel consumption while preventing the driveability from being deteriorated due to surges of the engine output occurring when the speed reduction ratio is large. In the meanwhile, among conventional methods for feedback-controlling the air-fuel ratio of an air-fuel mixture supplied to an internal combustion engine (hereinafter referred to as "supply air-fuel ratio") to a desired air-fuel ratio in response to the output of an exhaust gas ingredient concentration sensor having output characteristics proportional to the exhaust gas ingredient concentration, there is a method proposed by Japanese Provisional Patent Publication (Kokai) No. 63-12846 wherein in the case of setting the desired air-furl ratio to a value leaner than the stoichiometric air-fuel ratio, it is set to a leaner value as the reduction ratio of the transmission of the vehicle on which the engine is installed is smaller, in order to properly improve the rate of fuel consumption without impairing driving feeling or driveability.

However, the proposed apparatus and method suffer from a problem that when the travelling speed of the vehicle is low, the output torque of the engine becomes insufficient, which degrades the driveability of the vehicle.

SUMMARY OF THE INVENTION

It is the object of the invention to provide an air-fuel ratio control method for an internal combustion engine, which enables to secure excellent driveability irrespective of the travelling speed of the vehicle on which the engine is installed.

To attain the above object, the invention provides an air-fuel ratio control method for an internal combustion engine installed on a vehicle, the engine having an intake passage, an exhaust gas ingredient concentration sensor arranged in the exhaust passage for producing output substantially proportional to the concentration of an ingredient in exhaust gases emitted from the engine, and a transmission, wherein the air-fuel ratio of an air-fuel mixture supplied to the engine is feedback-controlled to a desired air-fuel ratio which is set to a value leaner than a stoichiometric air-fuel ratio, by the use of the output from the exhaust gas ingredient concentration sensor, depending upon operating conditions of the engine, and the desired air-fuel ratio is set to a leaner value as the transmission is set to a smaller reduction ratio.

The air-fuel ratio control method according to the invention is characterized by comprising the steps of:
(1) detecting a reduction ratio to which the transmission has been set;
(2) detecting travelling speed of the vehicle; and
(3) setting the desired air-fuel ratio to a richer value as the travelling speed of the vehicle is lower, insofar as the transmission is set to the same reduction ratio.

In a preferred embodiment, the feedback control of the air-fuel ratio may be carried out by calculating an air-fuel ratio correction coefficient in response to the output from the exhaust gas ingredient concentration sensor, determining a desired air-fuel ratio coefficient in response to operating conditions of the engine, and calculating an amount of fuel supplied to the engine by the use of the calculating air-fuel ratio correction coefficient and the determined desired air-fuel ratio coefficient.

Preferably, the desired air fuel ratio coefficient is set by the use of a basic fuel of the desired air-fuel ratio coefficient, and the step (3) comprises setting the basic value to a larger value as the travelling speed of the vehicle is lower, insofar as the transmission is set to the same reduction ratio.

The above and other objects, features and advantages of the invention will become more apparent from the ensuing detailed description taken in conjunction with the accompanying drawings.

BRIEF DESCRIPTION OF THE DRAWINGS

FIGS. 3, 3a and 3b are flowcharts of a program for calculating a basic value (KBSM) of the desired air-fuel ratio coefficient; and FIG. 4 is a diagram showing a map of basic values of the desired air-fuel ratio.

DETAILED DESCRIPTION

The method according to the invention will now be described in detail with reference to the drawings showing an embodiment thereof.

Figure 1:
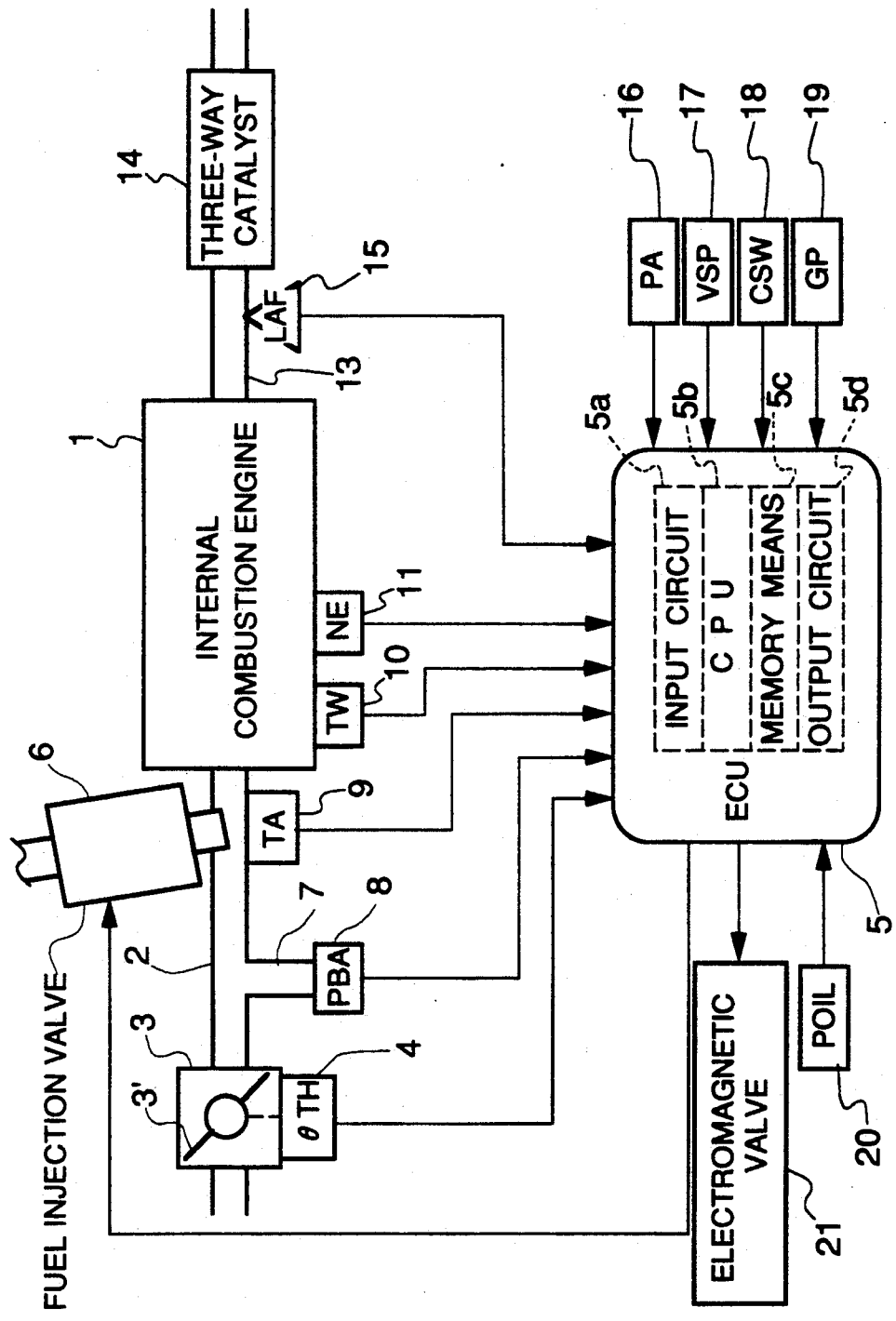
FIG. 1 is a block diagram illustrating the whole arrangement of a fuel supply control system for carrying out the control method of the invention.

Referring first to FIG. 1, there is shown the whole arrangement of a fuel supply control system which is adapted to carry out the control method of this invention. In the figure, reference numeral 1 designates a DOHC straight type four cylinder engine, each cylinder being provided with a pair of intake valves and a pair of exhaust values, not shown. This engine 1 is arranged such that the operating characteristics of the intake valves and exhaust valves (more specifically, the valve opening period and the lift (generically referred to hereinafter as "valve timing") permit selection between a high speed valve timing adapted to a high engine speed region and a low speed valve timing adapted to a low engine speed region.

In an intake pipe 2 of the engine 1, there is arranged a throttle body 3 accommodating a throttle body 3' therein. A throttle valve opening ($\theta$TH) sensor 4 is connected to the throttle valve 3' for generating an electric signal indicative of the sensed throttle valve opening and supplying same to an electronic control unit (hereinafter referred to as "the ECU") 5.

Fuel injection valves 6 are each provided for each cylinder and arranged in the intake pipe 2 between the engine 1 and the throttle valve 3, and at a location slightly upstream of an intake valve, not shown. The fuel injection valves 6 are connected to a fuel pump, not shown, and electrically connected to the ECU 5 to have their valve opening periods controlled by signals therefrom.

An electromagnetic valve 21 is connected to the output side of the ECU 5 to selectively control the aforementioned valve timing, the opening and closing of this electromagnetic valve 21 being controlled by the ECU 5. The valve 21 selects either high or low hydraulic pressure applied to a valve timing selection mechanism, not shown. Corresponding to this high or low hydraulic pressure, the valve timing is thereby adjusted to either a high speed valve timing or a low speed valve timing. The hydraulic pressure applied to this selection mechanism is detected by a hydraulic pressure (oil pressure) (POIL) sensor 20 which supplies a signal indicative of the sensed hydraulic pressure to the ECU 5.

Further, an intake pipe absolute pressure ($P_{BA}$) sensor 8 is provided in communication with the interior of the intake pipe 2 via a conduit 7 at a location immediately downstream of the throttle valve 3' for supplying an electrical signal indicative of the sensed absolute pressure to the ECU 5. An intake temperature ($T_A$) sensor 9 is inserted into the intake pipe 2 at a location downstream of the intake pipe absolute pressure sensor 8 for supplying an electric signal indicative of the sensed intake temperature $T_A$ to the ECU An engine coolant temperature ($T_W$) sensor 10, which may be formed of a thermistor or the like, is mounted in the cylinder block of the engine 1 for supplying an electric signal indicative of the sensed engine coolant temperature $T_W$ to the ECU 5. An engine rotational speed (NE) sensor 11 and a cylinder-discriminating (CYL) sensor 12 are arranged in facing relation to a camshaft or a crankshaft of the engine 1, neither of which is shown. The engine rotational speed sensor 11 generates a pulse as a TDC signal pulse at each of predetermined crank angles whenever the crankshaft rotates through 180 degrees, while the cylinder-discriminating sensor 12 generates a pulse at a predetermined crank angle of a particular cylinder of the engine, both of the pulses being supplied to the ECU 5.

A three-way catalyst 14 is arranged within an exhaust pipe 13 connected to the cylinder block of the engine 1 for purifying noxious components such as HC, CO and $NO_X$. An $O_2$ sensor 15 is an exhaust gas ingredient concentration sensor (referred to hereinafter as an "LAF sensor") is mounted in the exhaust pipe 13 at a location upstream of the three-way catalyst 14, for supplying an electric signal having a level approximately proportional to the oxygen concentration in the exhaust gases to the ECU 5.

Further electrically connected to the ECU 5 are an atmospheric pressure ($P_A$) sensor 16, a vehicle speed sensor 17, a clutch sensor 18 for detecting when the clutch is engaged and disengaged, and a gear position sensor 19 for detecting the shift position of a transmission, not shown. The signals from all these sensors are supplied to the ECU 5.

The ECU 5 comprises an input circuit 5a having the functions of shaping the waveforms of input signals rom various sensors, shifting the voltage levels of sensor output signals to a predetermined level, converting analog signals from analog-output sensors to digital signals, and so forth, a central processing unit (hereinafter referred to as "the CPU") 5b, memory means 5c storing various operational programs which are executed in the CPU 5b and for storing results of calculations therefrom, etc., and an output circuit 5d which outputs driving signals to the fuel injection valves 6 and the electromagnetic valve 21.

CPU 5b operates in response to the above-mentioned signals from the sensors to determine operating conditions in which the engine 1 is operating such as an air-fuel ratio feedback control region and open-loop control regions, and calculates, based upon the determined operating conditions, the valve opening period of fuel injection period $T_{OUT}$ over which the fuel injection valves 6 are to be opened by the use of the following equation (1) in synchronism with inputting of TDC signal pulses to the ECU 5:

$$T_{OUT} = T_i \times KCMDM \times KLAF \times K_1 + K_2 \qquad (1)$$

where $T_i$ represents a basic fuel amount, more specifically a basic fuel injection period which is determined according to the engine rotational speed Ne and the intake pipe absolute pressure $P_{BA}$. The value of $T_i$ is determined by a $T_i$ map stored in the memory means 5c.

KCMDM is a modified desired air-fuel ratio coefficient which is set by means of a program shown in FIG. 2, described hereinafter, according to engine operating conditions, and calculated by multiplying a desired air-fuel ratio coefficient KCMD representing a desired air-fuel ratio by a fuel cooling correction coefficient KETV. The correction coefficient KETV is intended to apply a prior correction to the fuel injection amount in view of the fact that the supply air-fuel ratio varies due to the cooling effect produced when fuel is actually injected, and its value is set according to the value of the desired air-fuel ratio coefficient KCMD. Further, as will be clear from the aforementioned equation (1), the fuel injection period $T_{OUT}$ increases if the desired fuel-air injection ratio coefficient KCMD increases, so that the values of KCMD and KCMDM will be in direct proportion to the reciprocal of the air-fuel ratio A/F.

KLAF is an air-fuel ratio correction coefficient which is set such that the air-fuel ratio detected by the LAF sensor 15 during air-fuel ratio feedback control coincides with the desired air-fuel ratio, and is set to predetermined values depending on engine operating conditions during open-loop control.

$K_1$ and $K_2$ are other correction coefficients and correction variables, respectively, which are calculated based on various engine parameter signals to such values as to optimize characteristics of the engine such as fuel consumption and accelerability depending on engine operating conditions.

The CPU 5b outputs a valve timing selection command signal depending on engine operating conditions, which causes opening and closing of the electromagnetic valve 21.

The CPU 5b performs calculations as described hereintofore, and supplies the fuel injection valves 6 and electromagnetic valve 21 with driving signals based on the calculation results through the output circuit 5d.

Figure 2:
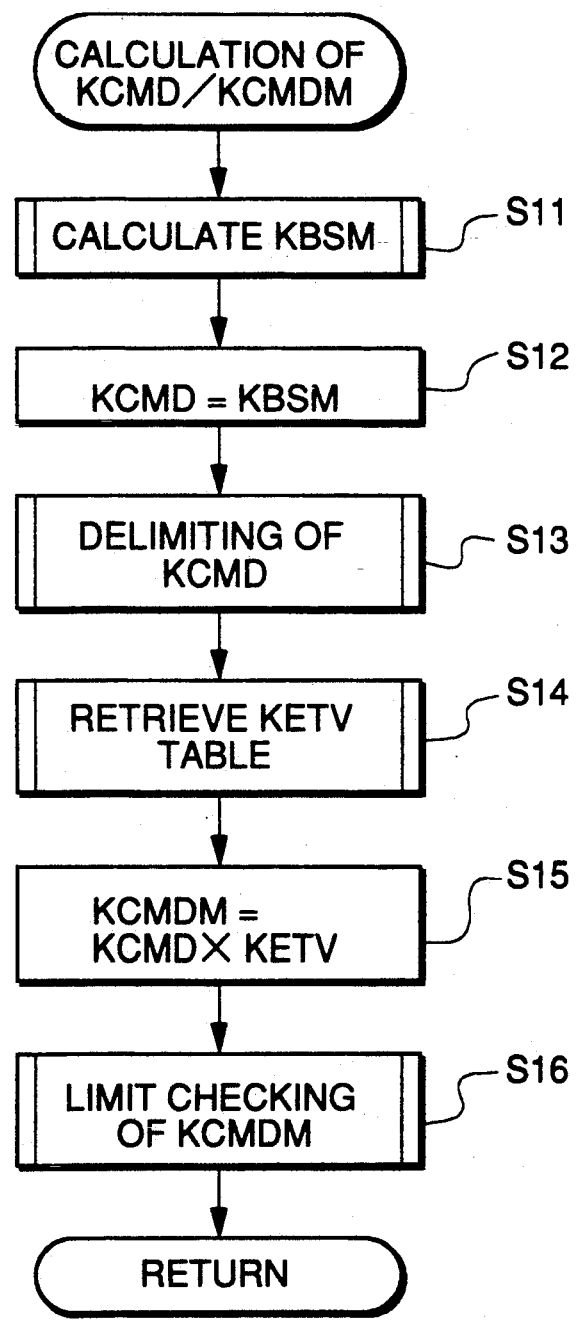
FIG. 2 is a flowchart of a program for calculating a desired air-fuel ratio coefficient (KCMD) and a modified desired air-fuel ratio coefficient (KCMDM)

FIG. 2 shows a flowchart of a program which calculates the desired air-fuel ratio coefficient KCMD and modified air-fuel ratio coefficient KCMDM, when the engine is in a normal operating condition other than a predetermined high load operating condition in which the fuel supply to the engine should be increased or a predetermined low load operating condition in which the fuel supply to the engine should be cut off. This program is carried out in synchronism with inputting of each TDC signal pulse to the ECU 5.

At a step S11, a basic value KBSM of the desired air-fuel ratio coefficient is calculated by a program described in detail hereinafter with reference to FIG. 3, and the calculated basic value KBSM is set as a value of the desired air-fuel ratio coefficient KCMD at a step S12. At a step S13, delimiting of the value of the coefficient KCMD is carried out such that the difference between the immediately preceding value and the present invention of the coefficient KCMD does not exceed an upper limit value set in accordance with engine operating conditions in order to prevent the value of the coefficient KCMD from being drastically changed. However, in the system according to the embodiment, under a condition that the coefficient KCMD assumes a value leaner than the stoichiometric air-fuel ratio, if the accelerator pedal is violently stepped on or in like cases, the value of the coefficient KCMD is immediately increased to a value corresponding to the stoichiometric air-fuel ratio.

Following the delimiting of the value of the coefficient KCMD, at a step S14, a value of the fuel cooling correction coefficient KETV is read from a table, not shown, in which values of the coefficient KETV are set in accordance with the coefficient KCMD, and the value of the coefficient KCMD is multiplied by the obtained value of the coefficient KETV to thereby calculate the modified desired air-fuel ratio coefficient KCMDM at a step S15. Then, limit checking of a value of the coefficient KCMDM is carried out at a step S16, followed by terminating the present program. In the limit checking, it is determined whether or not the value of the coefficient KCMDM falls within a range defined by predetermined upper and lower limit values, and if the value is outside the range, the coefficient KCMDM is set to the predetermined upper or lower limit value.

After execution of the present program, in another routine, not shown, when the engine is in a condition which enables to perform the air-fuel ratio feedback control, the air-fuel ratio correction coefficient KLAF is calculated such that an equivalent ratio KACT which is calculated based on the output from the LAF sensor 15 and representing a detected air-fuel ratio will become equal to the obtained modified desired air-fuel ratio coefficient KCMDM.

Figure 3A:
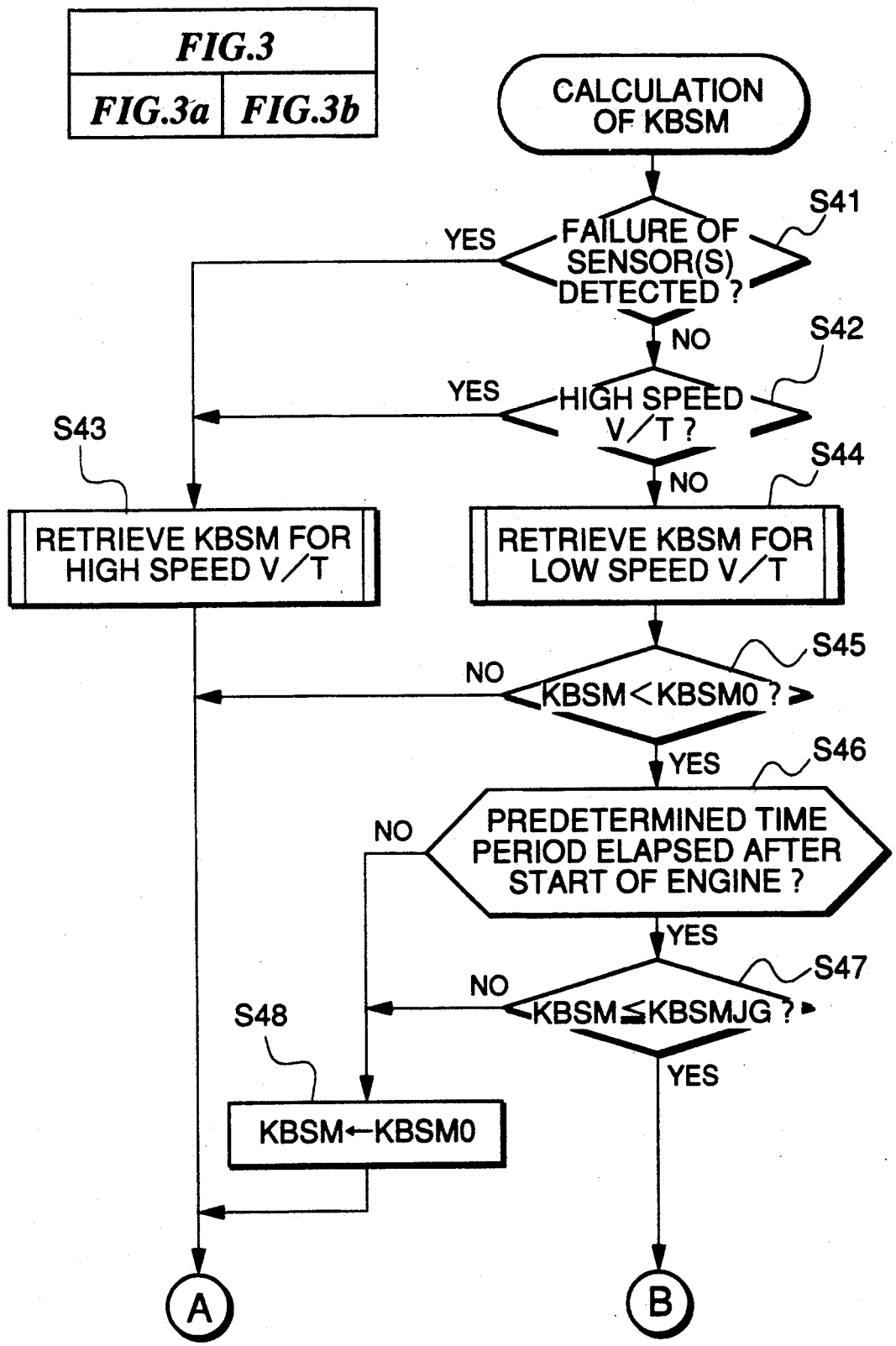
Figure 3B:
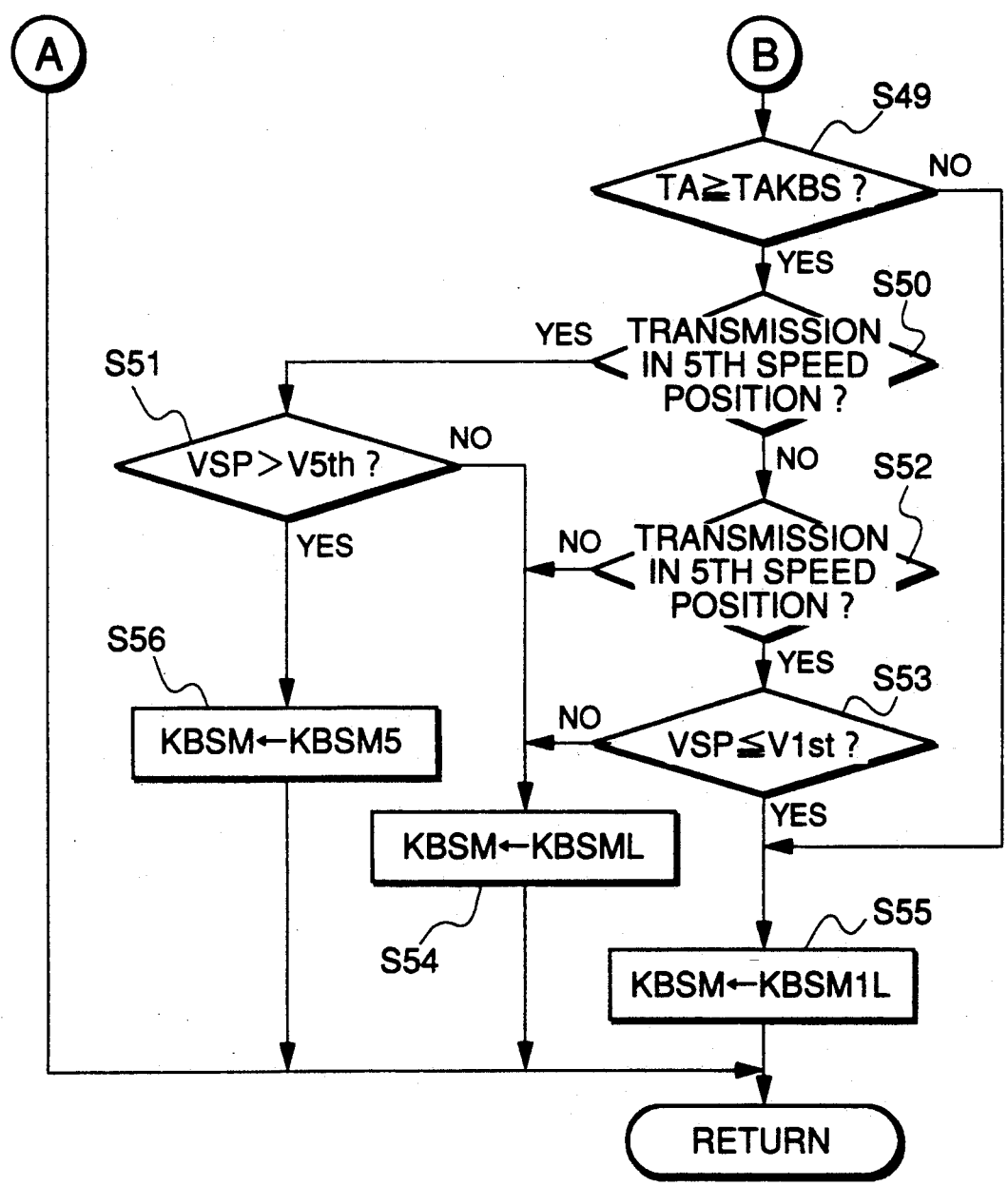

FIGS. 3a and 3b show a subroutine carried out at the step S11 in FIG. 2 to calculate the basic value KBSM of the desired air-fuel ratio coefficient.

At a step S41, it is determined whether or not failure of any related sensor etc connected to the ECU5 has been detected. If the answer to this question is negative (No), it is determined at a step S42 whether or not the high speed valve timing has been selected. If the answer to the question of the step S41 or S42 is affirmative (Yes), the basic value KBSM is read from a KBSM map for the high speed valve timing at a step S43, followed by terminating the present subroutine. In the KBSM map for the high speed valve timing, as shown in FIG. 4, for example, predetermined values $KBSM_{(1,1)}$ to $KBSM_{(20,10)}$ correspond to grid points determined by twenty predetermined values NEM1 to NEM20 of the engine rotational speed and ten predetermined values PB1 to PB10 of the intake pipe absolute pressure $P_{BA}$. A value of the basic value KBSM is read from the KBSM map in accordance with a detected value of the engine rotational speed NE and an estimated value (hereinafter referred to as an "estimated PBA value") of the intake pipe absolute pressure $P_{BA}$. If the detected engine rotational speed NE and the estimated PBA value assume values other than those of a grid point, the basic value KBSM is calculated by interpolation. In the KBSM map for the high speed valve timing, all the values of the basic value KBSM set therein are richer than a value corresponding to the stoichiometric air-fuel ratio. In this connection, a manner of calculation of the estimated PBA value is disclosed in Japanese Provisional Patent Publication (Kokai) No. 60-90948. Further, in the above retrieval from the KBSM map, the detected value of the intake pipe absolute pressure $P_{BA}$ may be used instead of the estimated PBA value.

If the answer to the question of the step S42 is negative (No), the basic value KBSM is read from a KBSM map for the low speed valve timing at a step S44, followed by the program proceeding to a step S45. In the KBSM map for the low speed valve timing as well, values of the basic value KBSM are set in relation to grid points determined by twenty predetermined values of the engine rotational speed NE and ten predetermined values of the intake pipe absolute pressure $P_{BA}$. However, the values of the basic value KBSM set therein include values leaner than the value corresponding to the stoichiometric air-fuel ratio (i.e. values for so-called lean burn) as well as values richer than same.

At the step S45, it is determined whether or not a value of the basic value KBSM obtained at the step S44 is smaller than a predetermined value KBSMO corresponding to the stoichiometric air-fuel ratio. If the answer to this question is negative (No), i.e. if KBSM≧KBSMO, the present routine is immediately terminated. If the answer to the question of the step S45 is affirmative (Yes), i.e. if KBSM<KBSMO, which means that the basic value KBSM assumes a value leaner than the value corresponding to the stoichiometric air-fuel ratio, it is determined at a step S46 whether or not a predetermined time period has elapsed after the start of the engine. If the answer to this question is affirmative (Yes), it is determined at a step S47 whether or not the value of the basic value KBSM obtained at the step S44 is equal to or lower than a predetermined reference value KBSMJG (e.g. a value corresponding to A/F=17). If the answer to the question of the step S46 or S47 is negative (No), i.e. if the predetermined time period has not elapsed after the start of the engine or if the condition of KBSM>KBSMJG is satisfied, the value of the basic value KBSM is set to the predetermined value KBSMO at a step S48, followed by terminating the present subroutine.

If both the answers to the questions of the steps S46 and S47 are affirmative (Yes), i.e. if the predetermined time period has elapsed after the start of the engine and the condition of KBSM≦KBSMJG is satisfied, it is determined at a step S49 whether or not the intake temperature $T_A$ is equal to or higher than a predetermined value TAKBS. If the answer to this question is negative (No), i.e. if $T_A$<TAKSB, the basic value KBSM is set to a predetermined value KBSM1L (e.g. a value corresponding to A/F=14.7) at a step S55, followed by terminating the present routine.

If the answer to the question of the step S49 is affirmative (Yes), i.e. if $T_A$≧TAKBS, it is determined at a step S50 whether or not the transmission is in the fifth speed position. If the answer to this question is affirmative (Yes), i.e. if the transmission is in the fifth speed position, it is determined at a step S51 whether or not the vehicle speed VSP is higher than a predetermined value V5th (e.g. 80 kg/hour) for the fifth speed position. If both the answers to the questions of the steps S50 and S51 are affirmative (Yes), i.e. if the transmission is in the fifth speed position and the vehicle speed is high (VSP>V5th), the basic values KBSM is set to a predetermined value KBSM5 (e.g. a value corresponding to A/F=22.0) for the fifth speed position and high vehicle speed, which is smaller (i.e. leaner) than the predetermined value KBSM1L, at a step S56, followed by terminating the present routine. If the answer to the question of the step S51 is negative (No), i.e. if the vehicle speed is lower (VSP≦V5th), the program proceeds to a step S54, where the basic value KBSM is set to a predetermined value KBSML (e.g. a value corresponding to A/F=21.0), which is smaller (i.e. leaner) than the predetermined value KBSM1L but larger than the predetermined value KBSM5.

If the answer to the question of the step S50 is negative (No), i.e. if the transmission is in a gear position other than the fifth speed position, it is determined at a step S52 whether or not the transmission is the first speed position. If both the answers to the questions of the steps S50 and S52 are negative (No), i.e. if the transmission is in a gear position other than the fifth and first speed positions, the program proceeds to the step S54, whereas if the transmission is in the first speed position, it is determined at a step S53 whether or not the vehicle speed VSP is equal to or lower than a predetermined value V1st (e.g. 30 km/hour) for the first speed position. If the answer to this question is negative (No), i.e. if VSP>V1st, the program proceeds to the step S54, whereas if the answer is affirmative (Yes), i.e. if VSP≦V1st, the program proceeds to the step S55, where the basic value KBSM is set to the predetermined value KBSM1L suitable for the first speed position and low vehicle speed, followed by terminating the present routine.

According to the above described steps S50 to S56, if the transmission is in the fourth speed position, for example, the basic value KBSM is set to the predetermined value KBSML irrespective of whether the condition of VSP>V5th is satisfied or not, whereas if the transmission is in the fifth speed position under the condition of VSP>V5th, the basic value KBSM is set to the predetermined value KBSM5 (<KBSML), thus setting the basic value KBSM to a leaner value as the gear ratio is higher. Further, in both the cases where the transmission is in the first speed position and where it is in the fifth speed position, the basic value KBSM is set to a richer value as the vehicle speed is lower, thus setting the desired air-fuel ratio coefficient KCMD to a richer value, in each of the gear positions, as the vehicle speed is relatively lower, which enables to prevent degradation of the driveability due to insufficient output torque of the engine.

What is claimed is:

1. In an air-fuel ratio control method for an internal combustion engine installed on a vehicle, said engine having an intake passage, an exhaust gas ingredient concentration sensor arranged in said exhaust passage for producing output substantially proportional to the concentration of an ingredient in exhaust gases emitted from said engine, and a transmission, wherein the air-fuel ratio of an air-fuel mixture supplied to the engine is feedback-controlled to a desired air-fuel ratio which is set to a value leaner than a stoichiometric air-fuel ratio, by the use of said output from said exhaust gas ingredient concentration sensor, depending upon operating conditions of said engine, and said desired air-fuel ratio is set to a leaner value as said transmission is set to a smaller reduction ratio, the improvement comprising the steps of:
(1) detecting a reduction ratio to which said transmission has been set;
(2) detecting travelling speed of said vehicle; and
(3) setting said desired air-fuel ratio to a richer value as said travelling speed of said vehicle is lower, insofar as said transmission is set to the same reduction ratio.

2. An air-fuel ratio control method according to claim 1, wherein said feedback control of the air-fuel ratio is carried out by calculating an air-fuel ratio correction coefficient in response to said output from said exhaust gas ingredient concentration sensor, determining a desired air-fuel ratio coefficient in response to operating conditions of said engine, and calculating an amount of fuel supplied to said engine by the use of said calculated air-fuel ratio correction coefficient and said determined desired air-fuel ratio coefficient.

3. An air-fuel ratio control method according to claim 2, wherein said desired air fuel ratio coefficient is set by the use of a basic value of said desired air-fuel ratio coefficient, and said step (3) comprises setting said basic value to a larger value as said travelling speed of said vehicle is lower, insofar as said transmission is set to the same reduction ratio.

* * * * *